United States Patent [19]
Abe et al.

[11] Patent Number: 5,674,575
[45] Date of Patent: Oct. 7, 1997

[54] LIQUID CRYSTAL ALIGNING FILM AND LIQUID CRYSTAL DISPLAY DEVICE USING IT

[75] Inventors: Yukino Abe; Shizuo Murata, both of Chiba-ken, Japan

[73] Assignee: Chisso Corporation, Osaka, Japan

[21] Appl. No.: 423,728

[22] Filed: Apr. 18, 1995

[30] Foreign Application Priority Data

Apr. 18, 1994 [JP] Japan ................... 6-104807

[51] Int. Cl.[6] ........................... C09K 19/00
[52] U.S. Cl. ................. 428/1; 252/299.01; 359/75; 359/76; 359/77; 428/473.5; 528/353
[58] Field of Search .............. 428/1, 473.5; 359/75, 359/76, 77, 78, 106; 252/299.01; 528/353

[56] References Cited

U.S. PATENT DOCUMENTS

| | | | |
|---|---|---|---|
| 4,367,924 | 1/1983 | Clark et al. | 350/334 |
| 4,749,777 | 6/1988 | Kohto | 428/1 |
| 5,186,985 | 2/1993 | Estes | 428/1 |
| 5,298,590 | 3/1994 | Isogai | 428/1 |
| 5,344,916 | 9/1994 | Harris | 428/1 |

FOREIGN PATENT DOCUMENTS 51-65960  6/1976  Japan .

*Primary Examiner*—Nasser Ahmad
*Attorney, Agent, or Firm*—Wenderoth, Lind & Ponack

[57] ABSTRACT

The present invention provides a liquid crystal aligning film containing as the principal constituent a polyimide resin, which comprises two or more diamines, and having a stripping load of 4.0 gf or more measured by particular conditions, and a liquid crystal display device using it. The liquid crystal aligning film has excellent resistance to liquid crystals, and does not have partial disorder of liquid crystal alignment caused by many scratches made by rubbing treatment.

3 Claims, 1 Drawing Sheet

LIQUID CRYSTAL ALIGNING FILM AND LIQUID CRYSTAL DISPLAY DEVICE USING IT

BACKGROUND OF THE INVENTION

1. Field of the Invention

The present invention relates to a liquid crystal aligning film and a liquid crystal display device using it. More particularly, the invention provides a liquid crystal aligning film having excellent resistance to liquid crystals, which does not have partial disorder of liquid crystal alignment caused by many scratches made by rubbing treatment.

2. Description of the Prior Art

Conventional liquid crystal display devices are used for a twist nematic (abbreviated as TN hereinafter) mode having a structure tilting the alignment direction of nematic liquid crystal molecules toward 90° between electrode substrates of a pair of upper and lower plates or a super twisted nematic (abbreviated as STN hereinafter) mode tilted toward 180°–300°.

Hitherto, in order to make matrix display or color display utilizing liquid crystals, MIM (metal-insulating layer-metal) devices switching ON-OFF many picture element electrodes, and twist nematic modes of an active type using TFT (thin film transistor) have been widely developed.

At the same time, new devices utilizing ferroelectric liquid crystals having excellent memory storage, high speed response time, high duty driving, and high density and high resolution of pictures have been proposed by Clark and Lagerwall (Japanese Laid-Open Patent Publication 56-107216 and U.S. Pat. No. 4367924) and modes using these devices have been widely developed.

However, the liquid crystal devices used in these modes have common problems that there is the so-called alignment disorder, in case of driving of the modes, wherein the alignment of liquid crystals in the device is partially disordered, which partially changes and flickers the colors. It is considered that the cause of the alignment disorder is due to scratches formed by the rubbing treatments of the devices, because rubbing lines are observed in the parallel or vertical direction against the rubbing direction with an atomic force microscope (AMF). In addition, the cause of rubbing is supported by the obvious alignment disorder caused by unsuitable rubbing conditions such as excessive pressured exerted on a rubbing cloth, slow rotational speed of the rubbing roller and slow moving rate of the substrate applied with the aligning film. The rubbing treatment is conducted to give alignment properties for a liquid crystal aligning film constituting a liquid crystal display device. It is considered that, according to the treatment conditions, excess scratches appear on the surface of the aligning film, the scratches remain as grooves, the alignment of the liquid crystals changes, the pretilt and the threshold value change, and the liquid crystal alignment around the grooves changes to give the alignment disorder. Particularly, such alignment disorder remarkably appears in ferroelectric liquid crystal to produce many line defects.

As the liquid crystal aligning films, films of organic types such as polyimide and polyamide are used. For example, Japanese Laid-Open Patent Publication 51-65960 discloses a liquid crystal aligning film using a polyimide resin having a repeating unit represented by the formula:

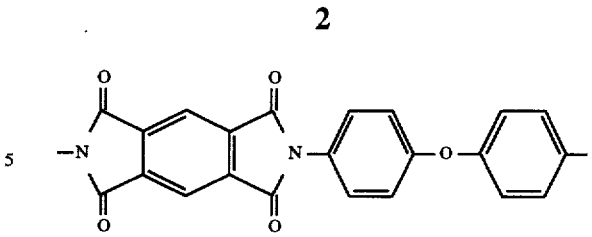

However, since the liquid crystal aligning film using such a polyimide resin tends to soften in the calcination at low temperature, it becomes easily scratched, and the alignment disorder remarkably appears.

As a method for improving the adhesion between a liquid crystal aligning film and a substrate to prevent the peeling of the liquid crystal aligning film, there is a method in which a component such as a silane coupling agent is added to the composition of the liquid crystal aligning film to obtain a tridimensional polymer. Using this method, a polar component of the surface energy of the liquid crystal aligning film tends to increase, and it gives a disadvantage that burning of the film appears easily.

SUMMARY OF THE INVENTION

An object of the present invention is to provide a liquid crystal aligning film of excellent resistance to liquid crystals without partial disorder of liquid crystal alignment (alignment disorder) caused by many scratches made by the rubbing treatment, and a liquid crystal display device using it.

The inventors of the present invention have earnestly studied and found that the use of a liquid crystal aligning film, which principally contains polyimide resin using two or more diamines, having a particular stripping load provides a surface which is hard to scratch, and having improved adhesion between the liquid crystal aligning film and the substrate, and there is no excessive defects and peeling which appear at the rubbing treatment of the liquid crystal aligning film to cause the alignment disorder. Further, they have found that the liquid crystals aligning film has excellent resistance to liquid crystals, and completed the present invention.

DETAILED DESCRIPTION OF THE INVENTION

The present invention has the following constitution.

(1) A liquid crystal aligning film containing as the principal constituent a polyimide resin comprising two or more diamines and having a stripping load of 4.0 gf or more measured by the conditions discussed below.

(2) A liquid crystal display device using the liquid crystal aligning film described in (1).

(3) The liquid crystal display device described in (2) using a nematic liquid crystal.

The stripping load of the liquid crystal aligning film is 4.0 gf or more, preferably 4.5 gf or more. When the stripping load is less than 4.0 gf, it is impossible to sufficiently prevent the alignment disorder.

The stripping load specified in the present invention is measured with a Shimazu scan type scratch tester (SST-100 type) manufactured by Shimazu Seisakusho Ltd. by the following conditions.

A measuring part of the scratch tester is detecting part 1 of a moving magnet type as shown in FIG. 1. Detecting part 1 vibrates on both sides by loading to rub together diamond needle 3, which is fixed under the tip of cantilever 2 projecting from detecting part 1, and sample surface 4. At the same time, since sample table 5 moves in front at a certain rate, the track (scratch) that diamond needle 3 makes on sample surface 4 forms a sine curve having a certain amplitude. The load increases at a certain rate with time, until the load exceeds the limit to peel off the film of the sample surface. The load value is called the stripping load when the film is peeled off. When the stripping load increases, it shows that the film is hard and has excellent adhesion properties between the film and the substrate. Since such a valuation is utilized as a relative valuation, it needs measuring under the following conditions.

Test mode: load test at a constant rate, diameter of the needle tip: 100 μm, vibrational amplitude: 100 μm, feed rate: 20 μm/s, loading speed 1 μm/s, loading full scale: 20 gf, sample film thickness: 3000±50 angstrom.

The component constituting the polyimide resin used in the liquid crystal aligning film of the present invention is not specially limited as long as the stripping load is 4.0 gf or more. To obtain the polyimide resin having a stripping load of 4.0 gf or more, diamines represented by the following formulas (1) to (57) may be used. One or more diamines of the following formulas (1) to (57) is preferably contained as the diamine component constituting the polyimide resin.

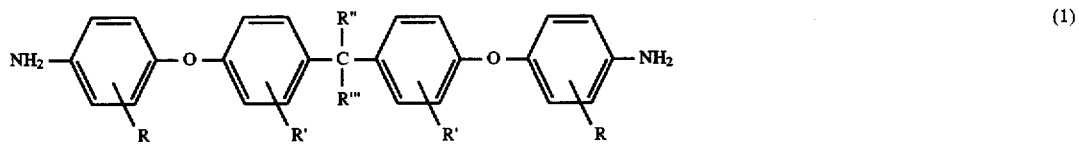

(1)

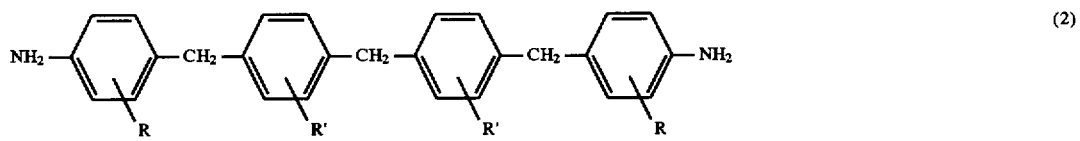

(2)

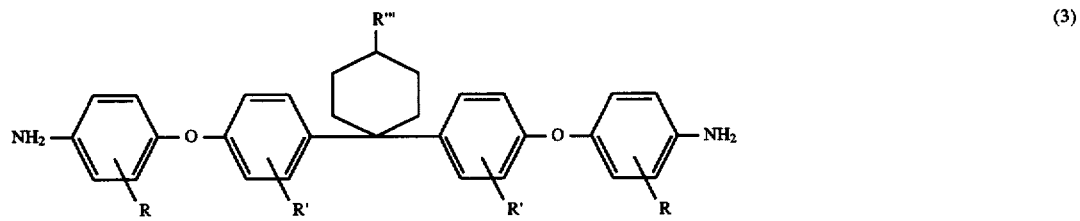

(3)

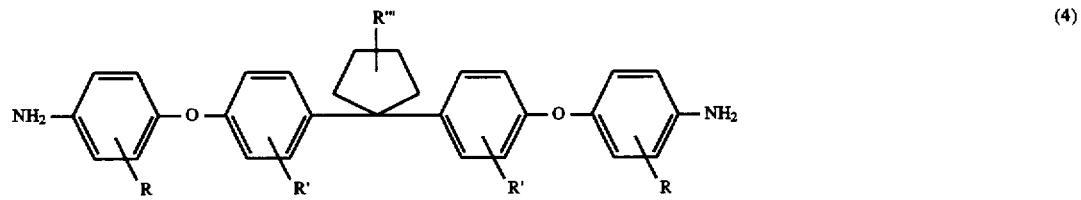

(4)

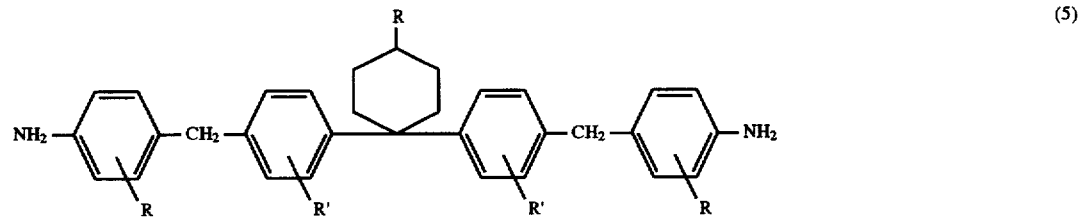

(5)

(6)

(7)

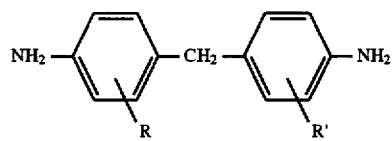 (8)
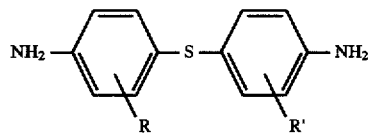 (9)
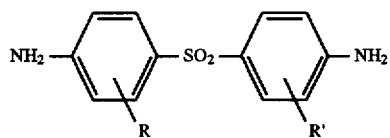 (10)
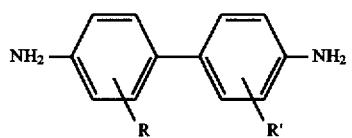 (11)
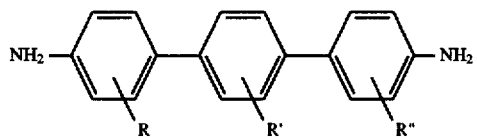 (12)
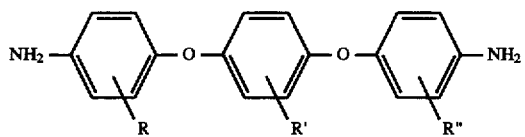 (13)
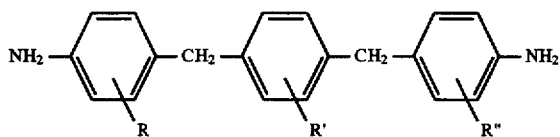 (14)
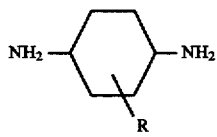 (15)
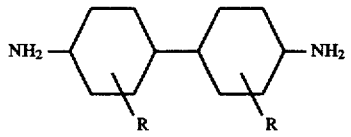 (16)
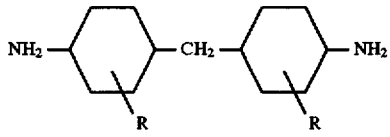 (17)
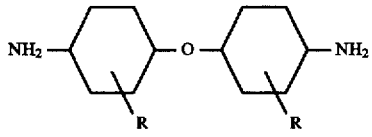 (18)
$NH_2-(CH_2)n-O-(CH_2)n-NH_2$ (19)
$NH_2-(CH_2)n-S-(CH_2)n-NH_2$ (20)

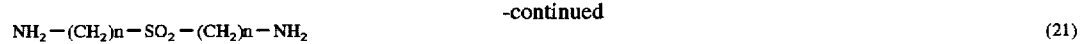 (21)
 (22)
 (23)
 (24)
 (25)
 (26)
 (27)
 (28)
 (29)
 (30)
 (31)
 (32)
 (33)
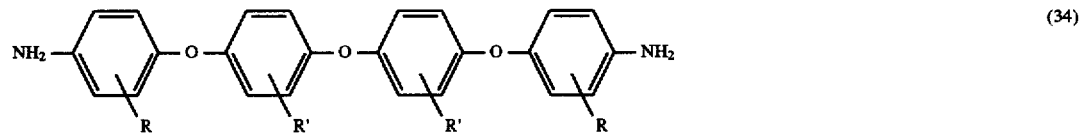 (34)
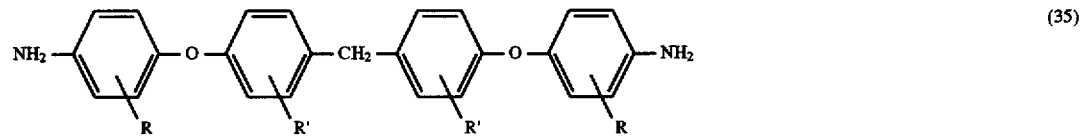 (35)
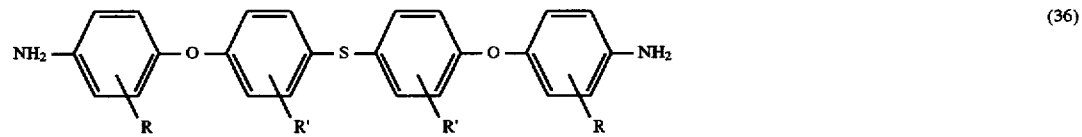 (36)
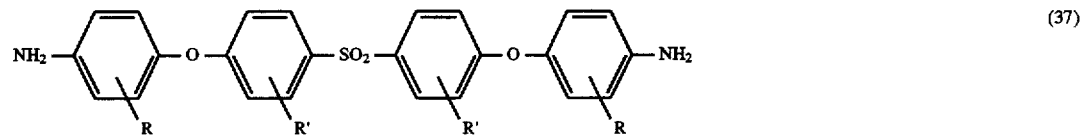 (37)
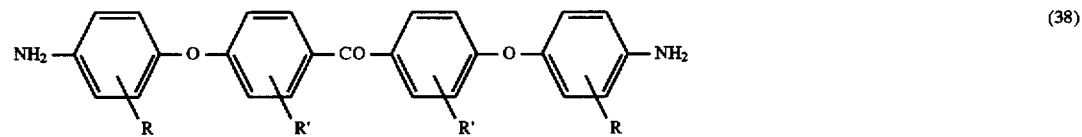 (38)
 (39)

-continued
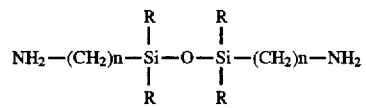 (40)
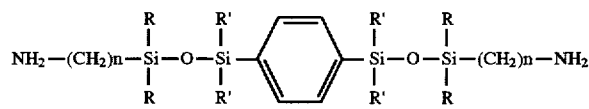 (41)
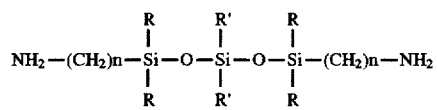 (42)
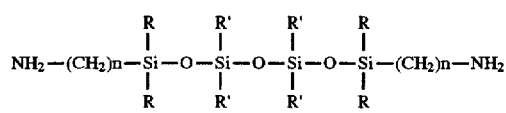 (43)
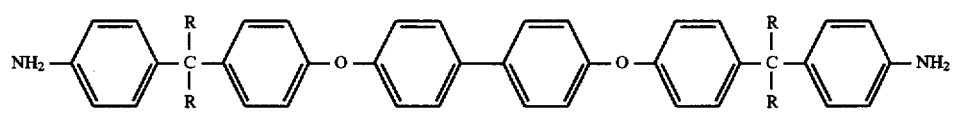 (44)
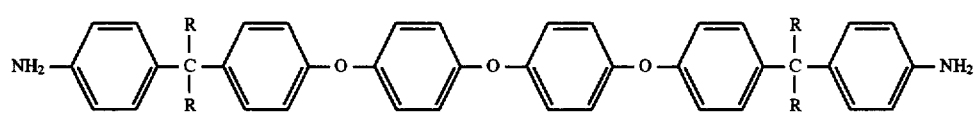 (45)
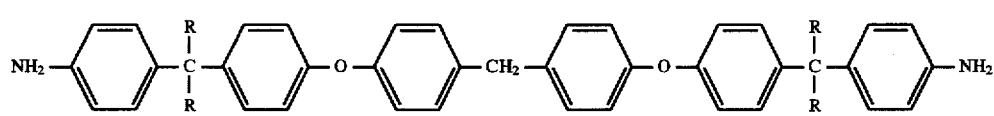 (46)
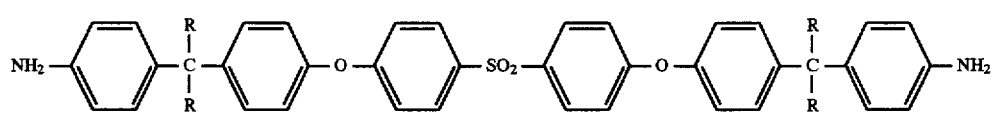 (47)
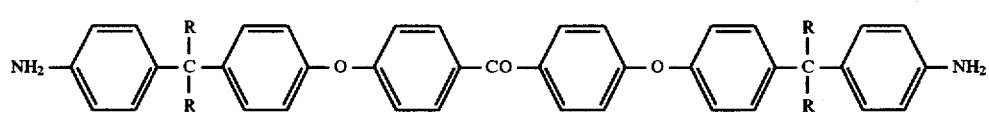 (48)
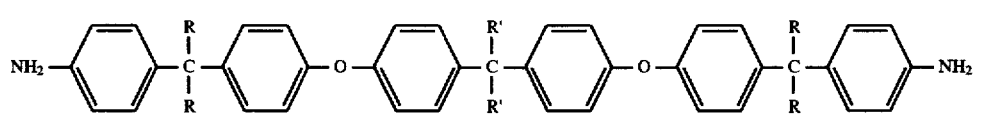 (49)
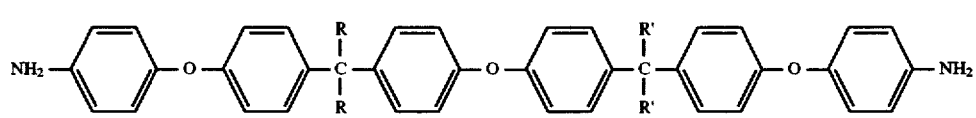 (50)
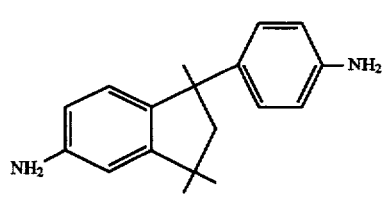 (51)
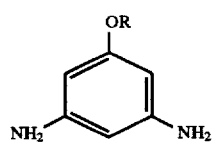 (52)

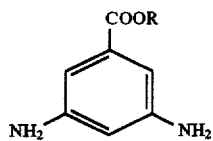 (53)
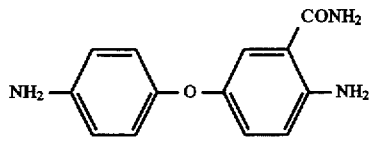 (54)
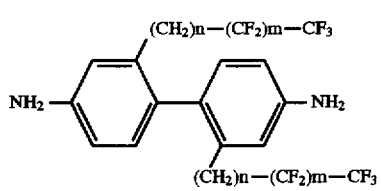 (55)
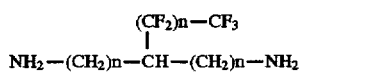 (56)
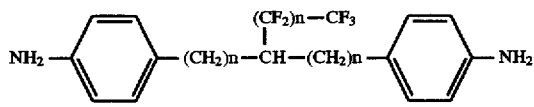 (57)
(in the formulas (1) to (57), R, R', R" and R'", each independently, indicates H, —$(CH_2)_n$—$CH_3$, F, —$(CF_2)_n$—$CF_3$, —O—$(CH_2)_{n-CH3}$ or —O—$(CF_2)_n$—$CF_3$, and m and n, each independently, indicates an integer of 0 to 20.)
Especially, diamines of the above formulas (1) to (5) are effectively used.
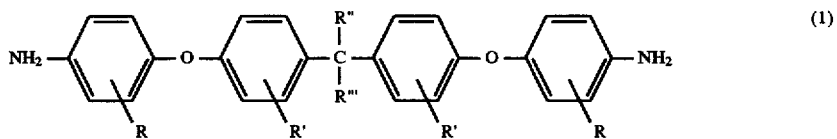 (1)
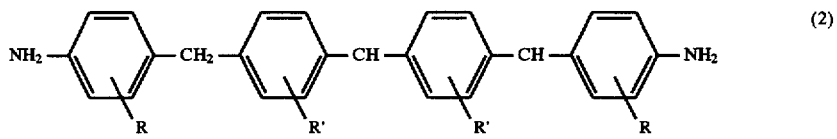 (2)
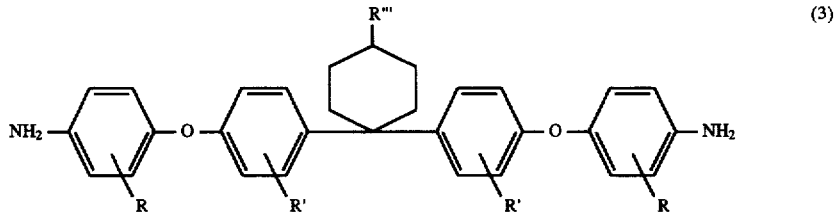 (3)
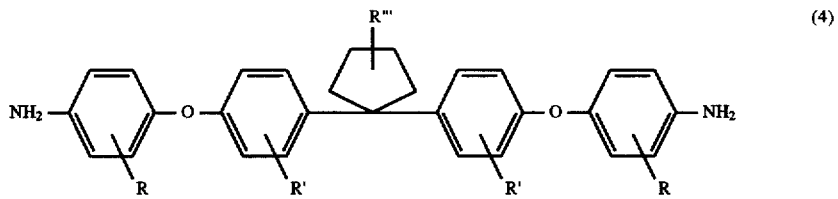 (4)

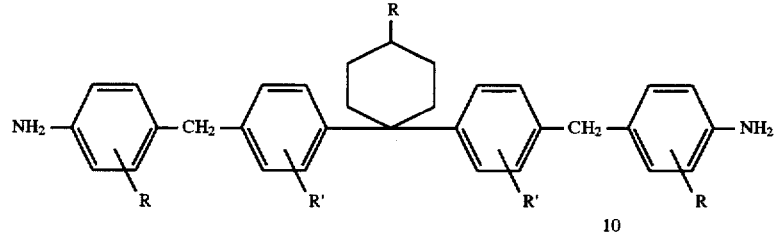
(5)

(in the formulas (1) to (5), R, R'R" and R'", each independently, indicates H, —(CH$_2$)$_n$—CH$_3$, F, —(CF$_2$)$_n$—CF$_3$, —O—(CH$_2$)$_n$—CH$_3$ or —O—(CF$_2$)$_n$—CF$_3$.

The diamine component constituting the polyimide resin of the present invention should contain two or more amine groups. When the diamine is used alone, it is impossible to obtain the aligning film which is hard to strip off, which is one of the merits of the present invention. A combination of the diamines having similar properties is preferably used because the stripping load is increased by synergistic effect.

A preferred example includes the combination of 1,1-bis[4-(4-aminophenoxy)phenyl]-4-methylcyclohexane and 1,1-bis[4-(4-aminophenoxy)phenyl]-4-propylcyclohexane or the like.

As the acid anhydride which is one component constituting the polyimide resin used in the liquid crystal aligning film of the present invention, the following compounds may be exemplified, but it should not be limited to these compounds.

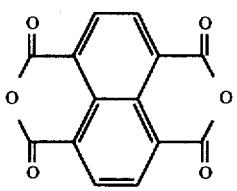
(58)

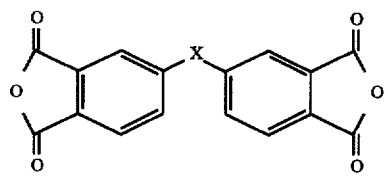
(59)

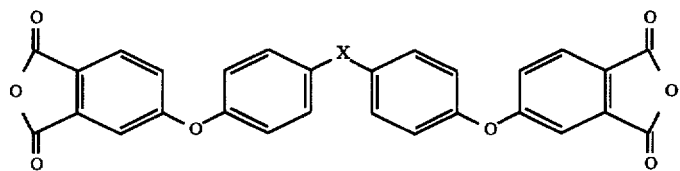
(60)

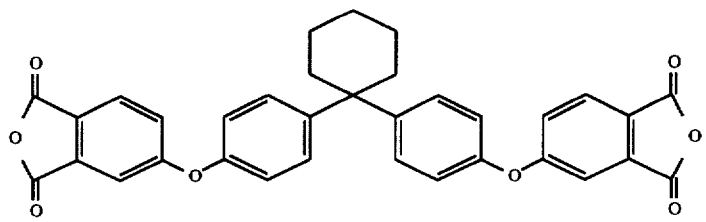
(61)

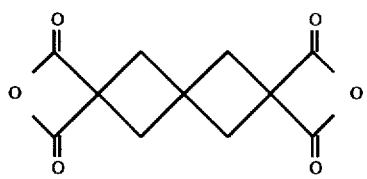
(62)

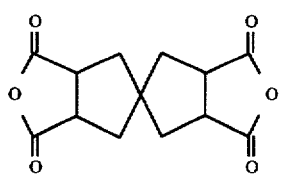
(63)

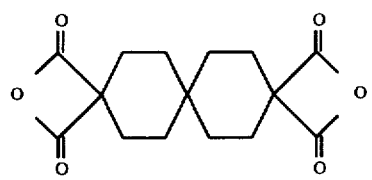
(64)
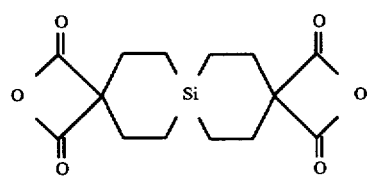
(65)
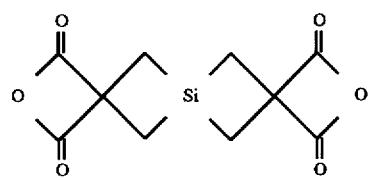
(66)
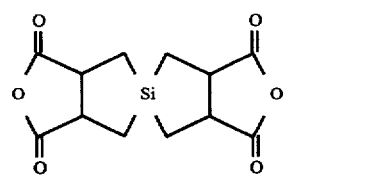
(67)
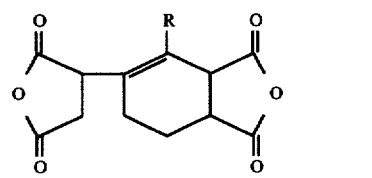
(68)
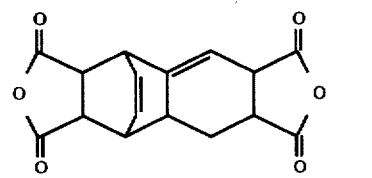
(69)
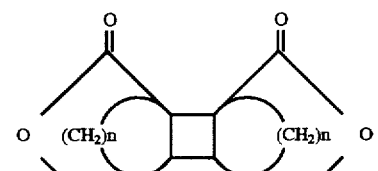
(70)
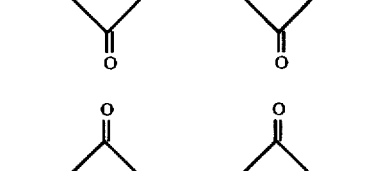
(71)

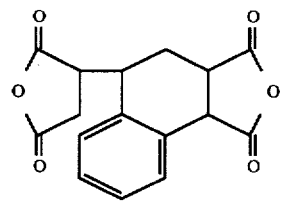 (72)
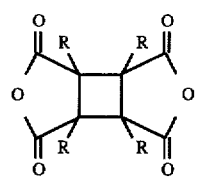 (73)
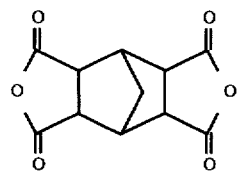 (74)
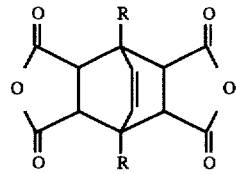 (75)
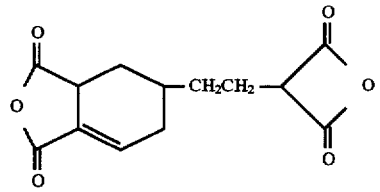 (76)
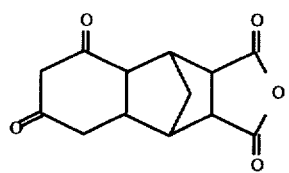 (77)
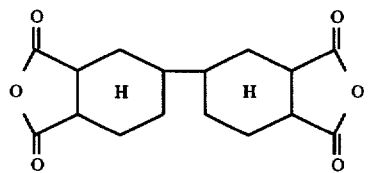 (78)
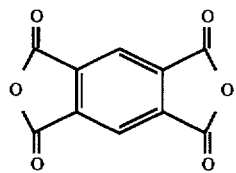 (79)
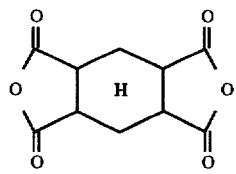 (80)

-continued
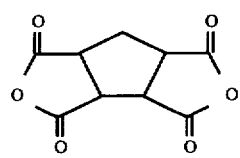 (81)
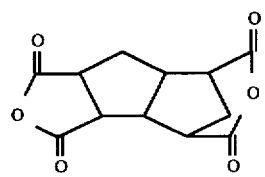 (82)
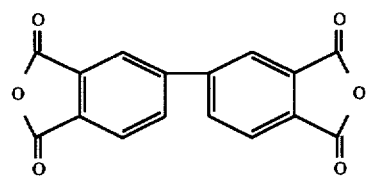 (83)
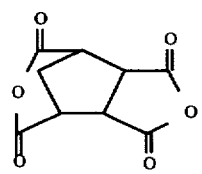 (84)
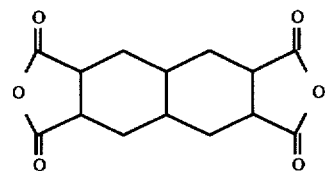 (85)
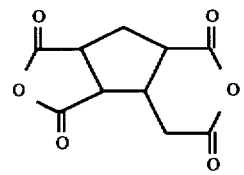 (86)
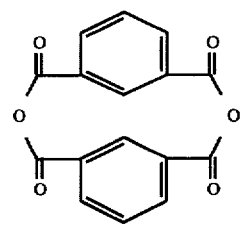 (87)
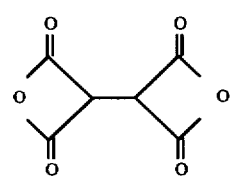 (88)
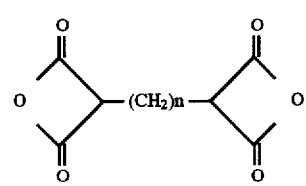 (89)

-continued
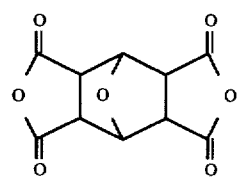
(90)
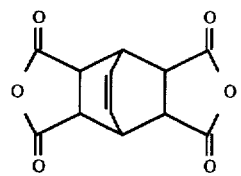
(91)
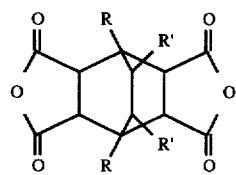
(92)
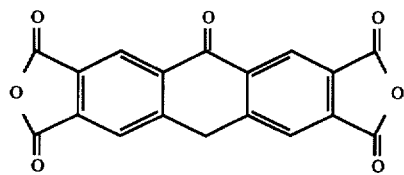
(93)
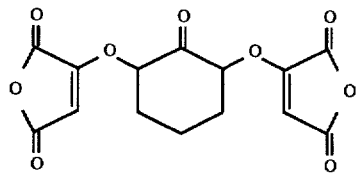
(94)
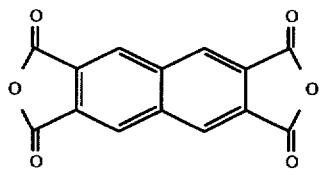
(95)
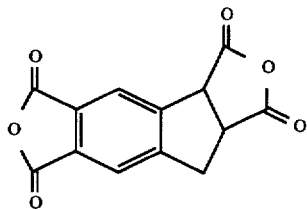
(96)
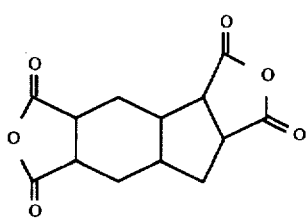
(97)

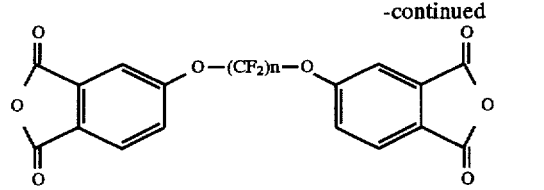 (98)
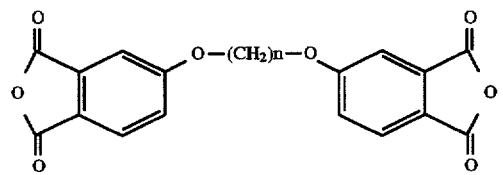 (99)
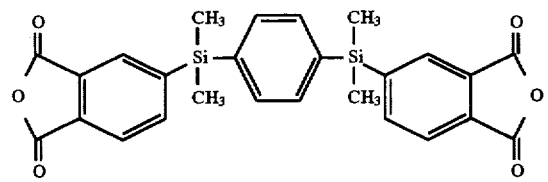 (100)
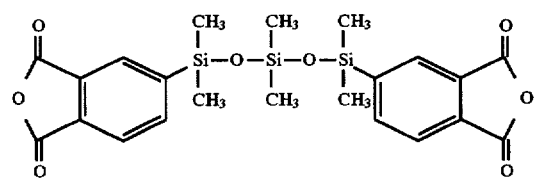 (101)
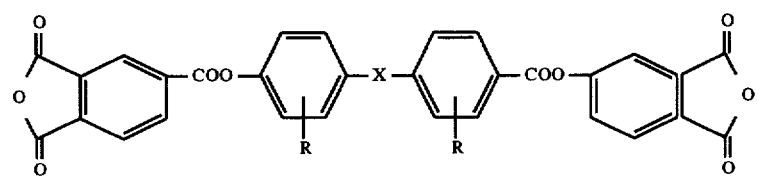 (102)
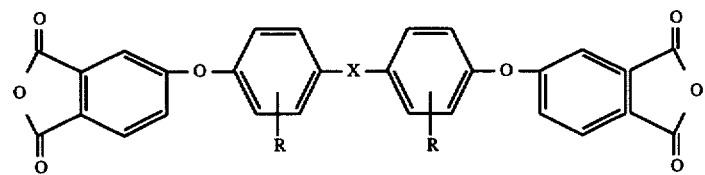 (103)
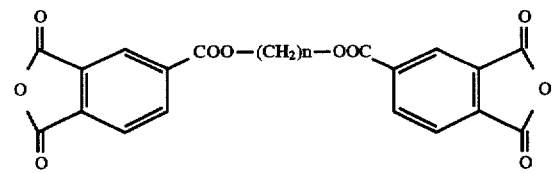 (104)
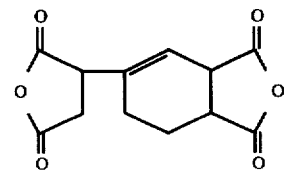 (105)
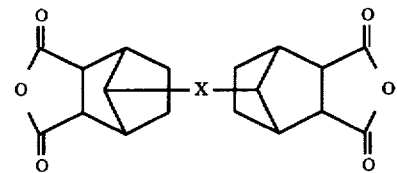 (106)

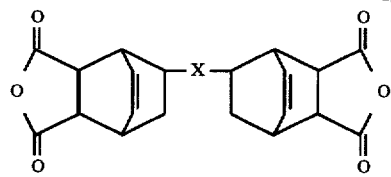

(107)

(in formulas (58) to (107), R and R', each independently, indicates H, —(CH$_2$)$_n$—CH$_3$, F, —(CF$_2$)$_n$—CF$_3$, —O—(CH$_2$)$_n$—CH$_3$ or —O—(CF$_2$)$_n$—CF$_3$, and n, each independently, indicates an integer of 0 to 20, and X indicates CH$_2$ or or O (oxygen)).

The liquid crystal aligning film of the present invention essentially consists of the polyimide resin obtained by condensation of diamine and acid anhydride. In addition, the liquid crystal display device of the present invention is obtained by setting the liquid crystal aligning film on the substrate.

In general, since the polyimide resin is insoluble in solvents, the polyamic acid obtained by condensation of acid anhydride (tetracarboxylic dianhydride) and diamine, which are precursors, is dissolved in a solvent and the solution is applied on the substrate and reacted by condensation to obtain the polyimide resin.

Embodying the condensation method, polyamic acid, which is a condensed material of an acid anhydride (tetracarboxylic dianhydride) with a diamine, is dissolved in solvent such as N-methyl-2-pyrrolidone (NMP), dimethylacetamide (DMAc), dimethylformamide (DMF), dimethyl sulfoxide (DMSO), butyl cellosolve (BC), ethyl carbitol, propylene glycol monobutyl ether, or 3-methyl-3-methoxybutanol to prepare a solution of polyamic acid of 0.1–30% by weight, preferably 1–10% by weight, and the solution is applied on a substrate by a brushing method, a dipping method, a spin coating method, a spray method, a printing method or the like to form a film of polyamic acid on the substrate. The substrate, on which the coating film is formed, is heated at 50°–150° C., preferably 80°–120° C. to evaporate the solvent in the coating film, and the temperature is raised to 150° C.–400° C., preferably 180° C.–280° C. to treat the substrate at that temperature, and the liquid crystal aligning film comprising the polyimide resin is obtained by dehydrating and ring closing reactions. If the adhesion between the liquid crystal aligning film and the substrate is incomplete, it is better to treat the surface of the substrate with a silane coupling agent before polyamic acid is applied. The resulting liquid crystal aligning film is rubbed in a given direction to use for a liquid crystal display device.

The polyamic acids used in the present invention may be alone or a mixture of two or more polyamic acids. However, the diamines constituting the polyamic acid are necessarily used as a mixture of two or more diamines. Preferably, it is desired to use a mixture of several polyamic acids constituted by different diamines. When two or more kinds of diamines are used for the liquid crystal aligning film, it becomes impossible to scrape the film against rubbing and to form the scratches causing alignment disorder or Vth disorder, and it is possible to improve the adhesive properties between the aligning film and the substrate and resistance to liquid crystals. Similarly, by using the above-described two or more acid anhydrides, it is possible to increase the hardness of the aligning film and it becomes impossible to scrape the film.

The substrate used in the liquid crystal display device of the present invention has transparent electrodes such as ITO (indium oxide-tin oxide) formed on the surface of the plate commonly used for the substrate. Further, an insulating film for preventing the elution of alkali from the glass substrate, a polarizing plate, a color filter film and the like may be formed as an under-sheet film, and an insulating film, a color filter film, a film for preventing light permeation and the like may be formed on the electrodes as an overcoat film.

The liquid crystal display device of the present invention is obtained by a method wherein a cell is made by using such a substrate, a liquid crystal is injected into the cell, and the injection hole is closed. The device is also obtained by a method wherein a liquid crystal is sprayed on a substrate, another substrate is put on the sprayed surface, and the device is sealed to prevent leakage of the liquid crystal. Although the liquid crystal to be injected is not limited and many kinds of liquid crystals such as a nematic liquid crystal, a liquid crystal to which is added a two-tone color, a ferroelectric liquid crystal, etc. may be used, in the liquid crystal aligning film of the present invention, the nematic liquid crystal is preferably used, because the film has excellent alignment properties for the nematic liquid crystal.

Examples of such nematic liquid crystals are (A) an anisotropic compound having a high ferroelectricity of $\Delta\epsilon \geq 5$, (B) an anisotropic compound having a low ferroelectricity of $\Delta\epsilon < 5$, (C) a compound having a transparent point of above 80° C., and (D) other compounds. These nematic liquid crystals may be used by mixing any compound selected from the compounds (A) to (D) to control the desired conditions for use, such as a voltage of a threshold limit value, a viscosity or a temperature range of the liquid crystal.

Examples of the nematic liquid crystal of the above (A) are shown in the following.

(A1)

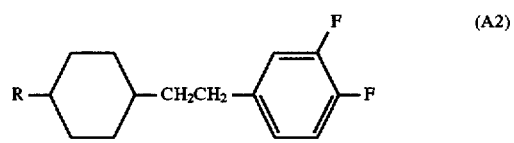

(A2)

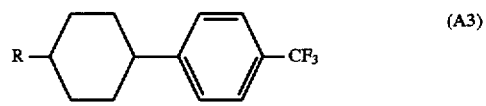

(A3)

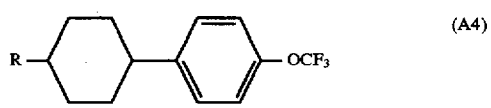

(A4)

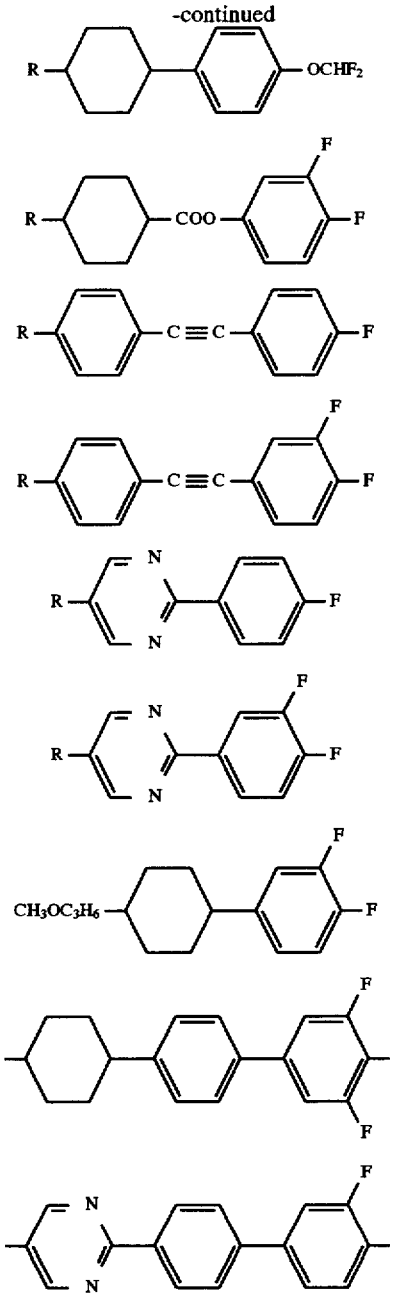
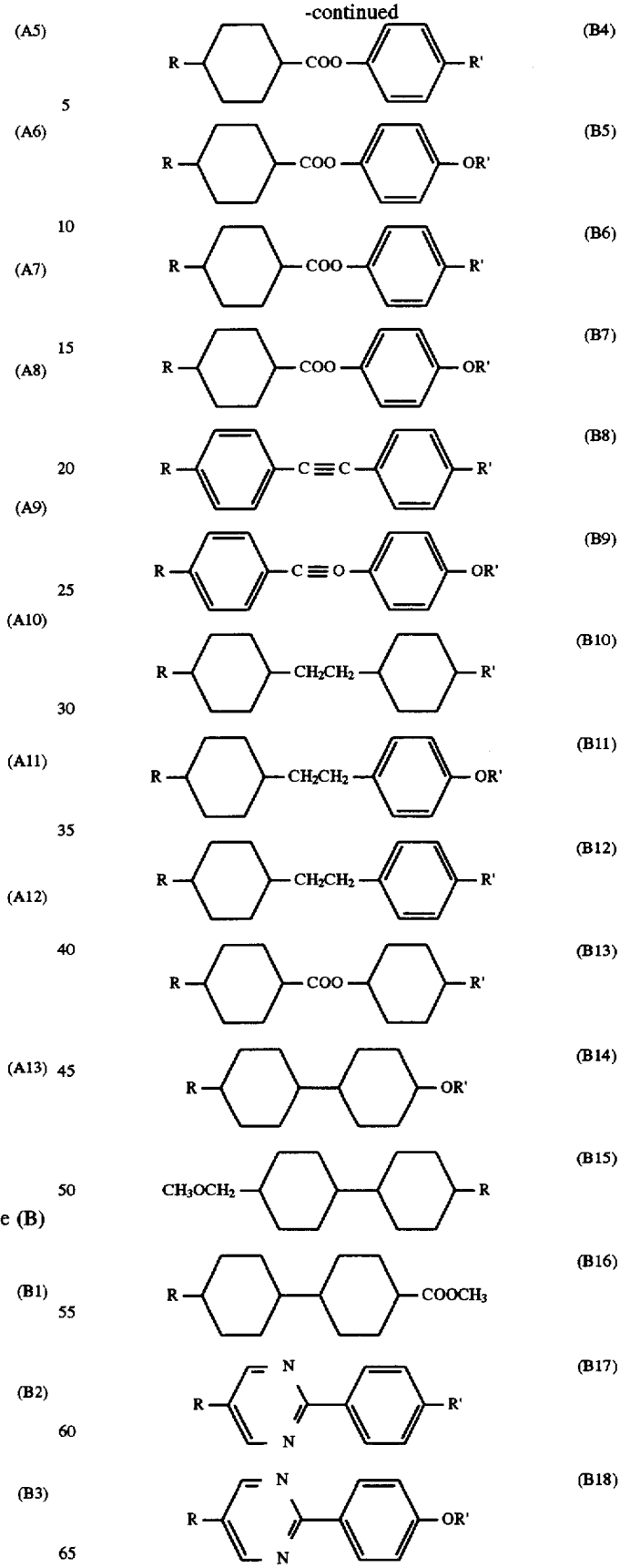
Examples of the nematic liquid crystal of the above (B) are shown in the following.
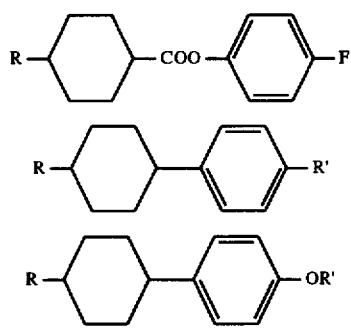

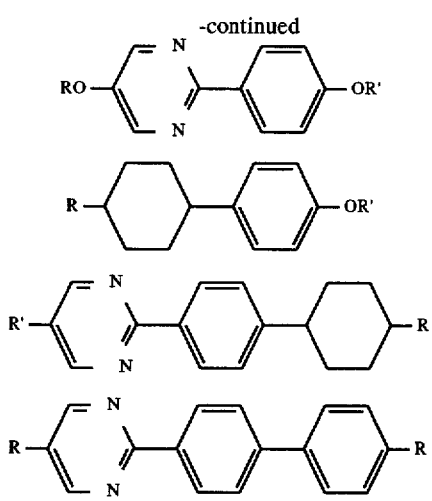
Examples of the nematic liquid crystal of the above (C) are shown in the following.
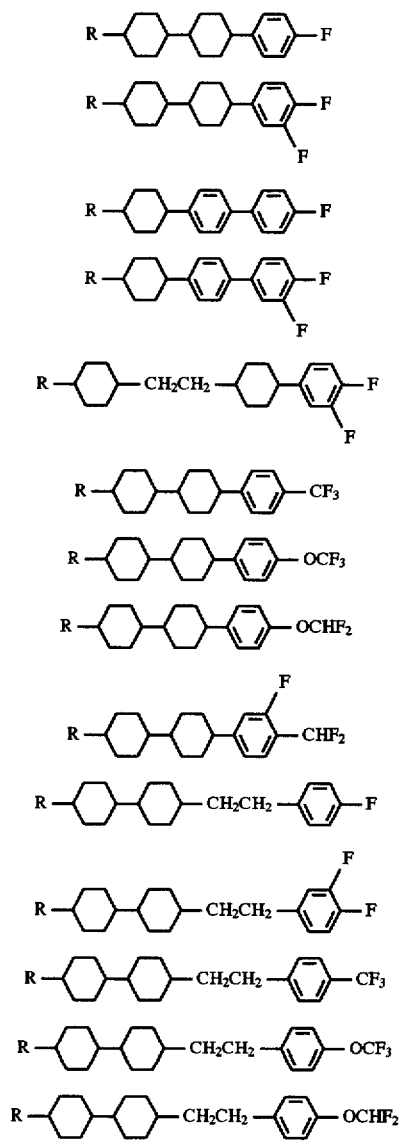
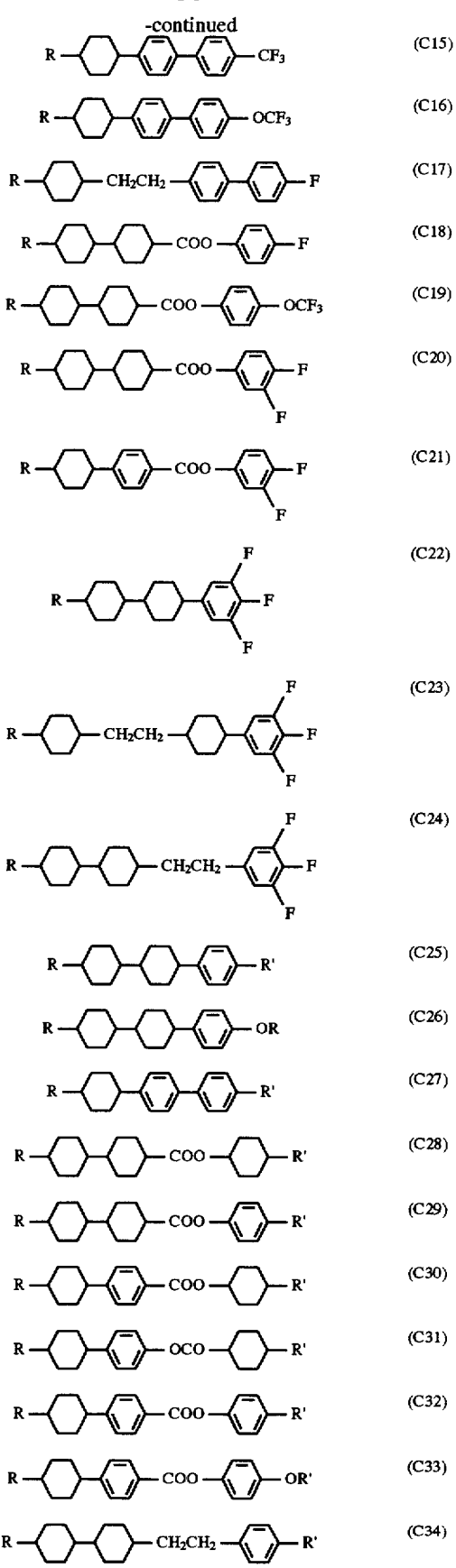

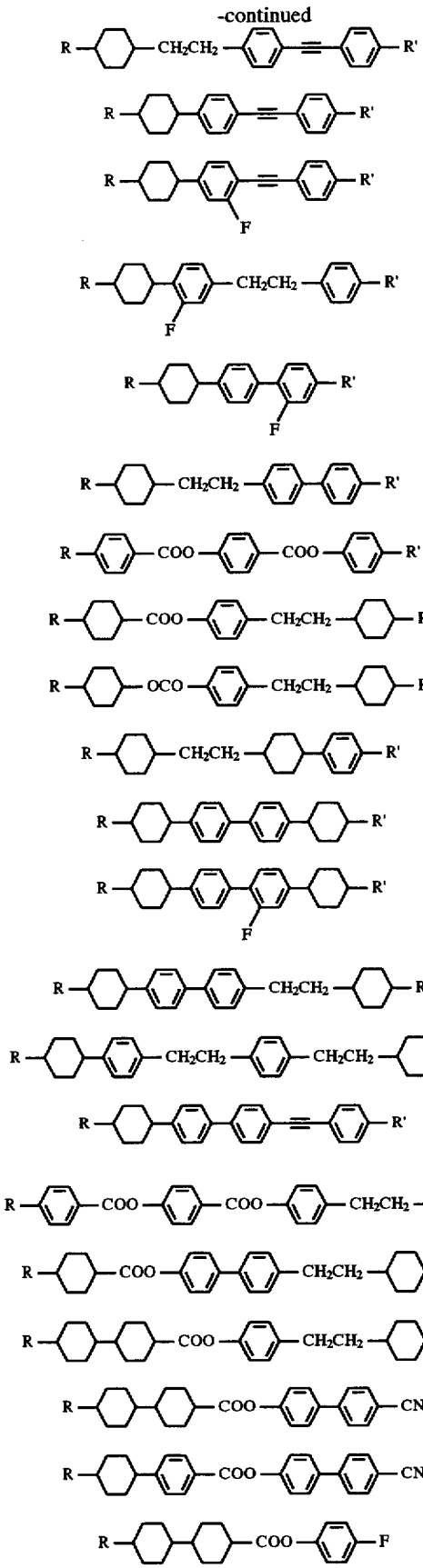
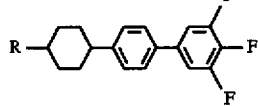
Examples of the nematic liquid crystal of the above (D) are shown in the following.
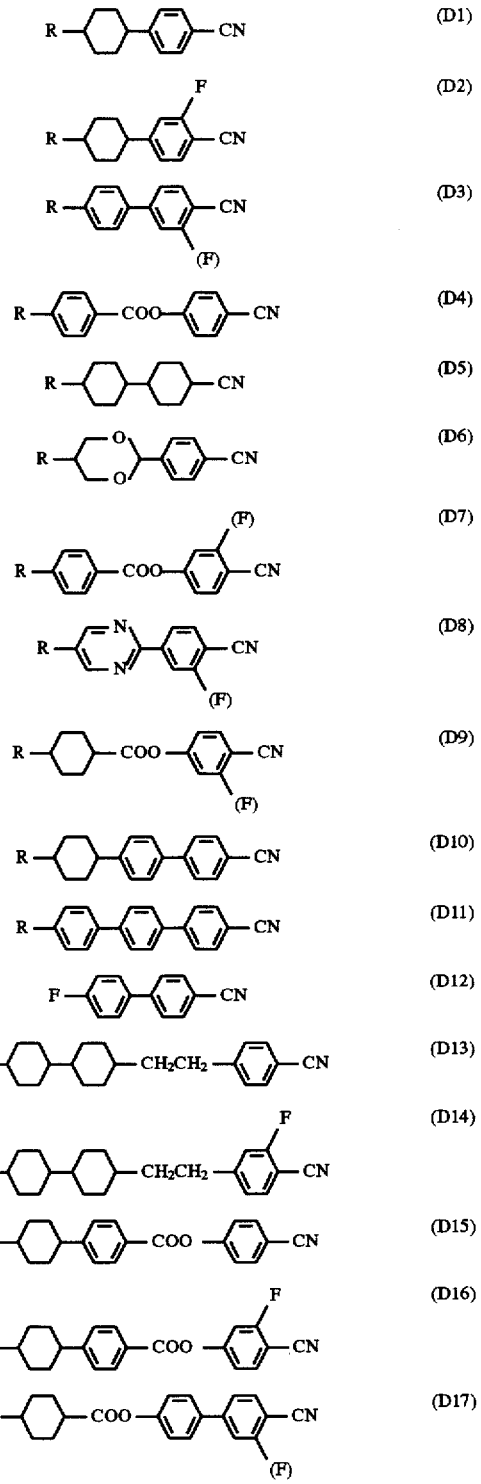

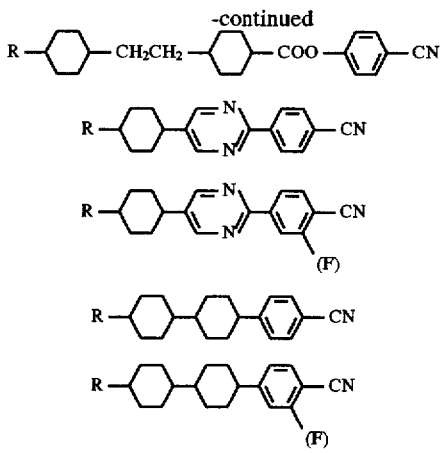

However, in the present invention, there is no problem by using nematic liquid crystals other than the above compounds so long as the objects of the present invention are attained.

Since the liquid crystal aligning film of the present invention is hard to scratch, it is impossible to produce rubbing scratches causing the disorder of the liquid crystal alignment. As such scratches are not produced and the alignment disorder (such as Vth disorder or line disorder) seldom occurs, the liquid crystal aligning film has excellent liquid crystal alignment properties. Further, the film has excellent adhesion between the liquid crystal aligning film and the substrate, and has excellent resistance to liquid crystals.

It is possible to provide a liquid crystal display device having excellent liquid crystal alignment properties, display characteristics and a high pretilt angle by using the liquid crystal aligning film. In addition, the liquid crystal display device of the present invention may be used for a ferroelectric liquid crystal device and a surface-stabilized nematic liquid crystal device (SSNLC).

Figure 1:
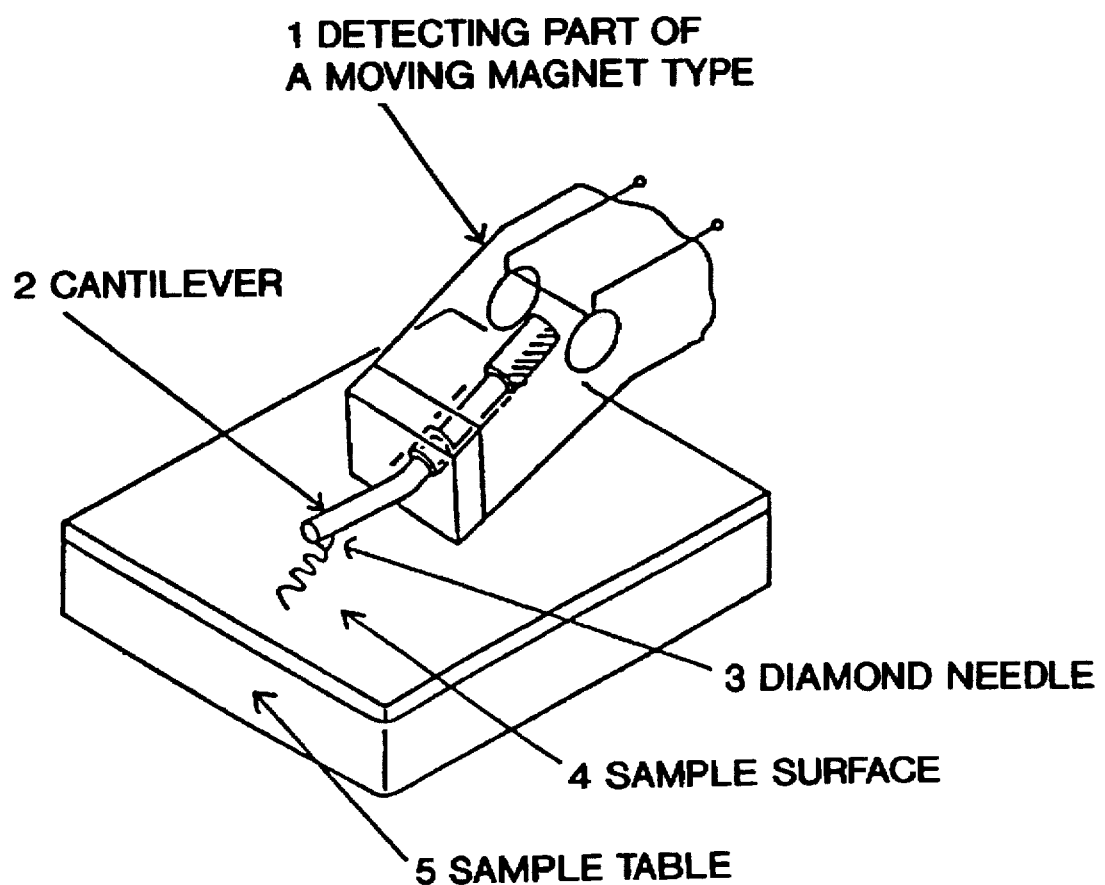
FIG. 1 is a schematic illustration of a detecting part of a scratch tester.

1: Detecting part of a moving magnet type
2: Cantilever
3: Diamond needle
4: Sample surface
5: Sample table

DESCRIPTION OF THE PREFERRED EMBODIMENTS

The following examples illustrate the present invention more specifically, but these will not always be precise in practical applications.

EXAMPLE 1

To a 1000 ml four-necked flask equipped with a stirrer, a thermometer, a condenser and a nitrogen displace apparatus, 200 ml of N-methyl-2-pyrrolidone, which had been dehydrated to purify it, and then 13.7 g of 1,1-bis[4-(4-aminophenoxy)phenyl]-4-methylcyclohexane and 14.5 g of 1,1-bis[4-(4-aminophenoxy)phenyl]-4-propylcyclohexane were charged, and the mixture was dissolved with stirring. Then, the solution was cooled to 13° C., 13.08 g of pyromellitic dianhydride was added all at once, and the mixture was reacted with stirring and cooling. After one hour, 0.39 g of para-aminophenyltrimethoxysilane was added, and the mixture was reacted with stirring at 20° C. Then, the reaction solution was diluted with a mixed solvent of N-methyl-2-pyrrolidone (NMP) and butyl cellosolve (BC) to obtain a transparent solution containing polyamic acid of 6% by weight. The viscosity of the solution was 61.9 centipoises at 25° C.

The solution was applied on the substrate provided with an ITO electrode at one side of transparent glass by a spin coating method (a Spinner method). The coating conditions were 3000 rpm and 15 seconds. Then, the substrate having such coating film was dried at 100° C. for 10 minutes, put into an oven, and heated to 200° C. for one hour. At the same temperature, the substrate was heated for 90 minutes to obtain liquid crystal aligning film of polyimide resin having film thickness of 3000 angstrom. After the resulting liquid crystal aligning film was left overnight at room temperature to determine the stripping load of the liquid crystal aligning film, the stripping load was 4.3 gf. Further, the adhesion to the substrate of the liquid crystal film was satisfactory.

Then, the solution of polyamic acid was diluted with a solution of 1:1 ratio of butyl cellosolve and NMP to obtain a 3% by weight solution of polyamic acid, and the solution was applied by a spin coating method (a Spinner method) on the substrate provided with the ITO electrode at one side of transparent glass. The coating conditions were 3500 rpm and 15 seconds. Then, the substrate having such coating film was dried at 100° C. for 10 minutes, put into an oven, and heated to 200° C. for one hour. At the same temperature, the substrate was heated for 90 minutes to obtain the liquid crystal aligning film of polyimide resin having film thickness of 600 angstrom.

Then, the resulting liquid crystal aligning film was rubbed. The rubbing was done at 0.4 mm of pushing length by using a piece of rayon cloth having 1.8 mm of pile length. Using two substrates comprised of the liquid crystal aligning films obtained by rubbing treatment, a liquid crystal cell was assembled so that the substrates were formed in parallel to the rubbing directions and opposed each other at intervals of 6 microns. Liquid crystal FB01 for TFT manufactured by CHISSO CORPORATION was enclosed in the cell, heated at 120° C. for 30 minutes to conduct isotropic treatment, and cooled slowly to room temperature to obtain a liquid crystal display device.

In the liquid crystal display device, no scratches by the rubbing treatment and no alignment disorder were observed at a lighting test of the liquid crystal display device. Further, the dissolution of the aligning film in the liquid crystal was not observed at all.

EXAMPLE 2

To a 1000 ml four-necked flask equipped with a stirrer, a thermometer, a condenser and a nitrogen displace apparatus, 200 ml of N-methyl-2-pyrrolidone, which had been dehydrated to purify it, and then 13.69 g of 1,1-bis[4-(4-aminophenoxy)phenyl]-4-methylcyclohexane and 14.51 g of 1,1-bis[4-(4-aminophenoxy)phenyl]-4-propylcyclohexane were charged, and the mixture was dissolved with stirring. Then, the solution was cooled to 13° C., 9.80 g of pyrromellitic dianhydride and 2.98 g of methylcyclobutyric dianhydride were added all at once, and the mixture was reacted with stirring and cooling. After one hour, 0.39 g of para-aminophenyltrimethoxysilane was added, and the mixture was reacted with stirring at 20° C. Then, the reaction solution was diluted with a solution of N-methyl-2-pyrrolidone (NMP) and butyl cellosolve (BC)

to obtain a transparent solution containing polyamic acid of 6% by weight. The viscosity of the solution was 56.0 centipoises at 25° C.

The solution was applied on the substrate provided with an ITO electrode at one side of transparent glass by a spin coating method (a Spinner method). The coating conditions were 3000 rpm and 15 seconds. Then, the substrate having such coating film was dried at 100° C. for 10 minutes, put into an oven, and heated at 200° C. for one hour. At the same temperature, the substrate was heated for 90 minutes to obtain liquid crystal aligning film of polyimide resin having film thickness of 3000 angstrom. After the resulting liquid crystal aligning film was left overnight at room temperature to determine the stripping load of the liquid crystal aligning film, the stripping load was 4.8 gf. Further, the adhesion to the substrate of the liquid crystal film was satisfactory.

Then, the solution of polyamic acid was diluted with a solution of 1:1 ratio of butyl cellosolve and NMP to obtain a 3% by weight solution of polyamic acid, and the solution was applied by a spin coating method (a Spinner method) on the substrate provided with the ITO electrode at one side of transparent glass. The coating conditions were 3000 rpm and 15 seconds. Then, the substrate having such coating film was dried at 100° C. for 10 minutes, put into an oven, and heated to 200° C. for one hour. At the same temperature, the substrate was heated for 90 minutes to obtain the liquid crystal aligning film of polyimide resin having film thickness of 600 angstrom.

Then, the resulting liquid crystal aligning film was rubbed. The rubbing was conducted at 0.4 mm of pushing length by using a piece of rayon cloth having 1.8 mm of pile length. Using two substrates comprised of the liquid crystal aligning films obtained by rubbing treatment, a liquid crystal cell was assembled so that the substrates were formed in parallel to the rubbing directions and opposed each other at intervals of 6 microns. Liquid crystal FB01 for TFT manufactured by CHISSO CORPORATION was enclosed in the cell, and the cell was heated at 120° C. for 30 minutes to conduct isotropic treatment, and cooled slowly to room temperature to obtain a liquid crystal display device.

In the liquid crystal display device, no scratches by the rubbing treatment and no alignment disorder were observed at a lighting test of the liquid crystal display device. Further, the dissolution of the aligning film in the liquid crystal was not observed at all.

EXAMPLE 3

To a 1000 ml four-necked flask equipped with a stirrer, a thermometer, a condenser and a nitrogen displace apparatus, 200 ml of N-methyl-2-pyrrolidone, which had been dehydrated to purify it, and then 14.3 g of 1,1-bis[4-(4-aminophenoxy)phenyl]-4-ethylcyclohexane was charged, and the mixture was dissolved with stirring. Then, the solution was cooled to 13° C., 6.54 g of pyromellitic dianhydride was added all at once, and the mixture was reacted with stirring and cooling. After one hour, 0.39 g of paraaminophenyltrimethoxysilane was added, and the mixture was reacted with stirring at 20° C. Then, the reaction solution was diluted with a solution of N-methyl-2-pyrrolidone (NMP) and butyl cellosolve (BC) to obtain a transparent solution containing polyamic acid 1 of 6% by weight.

To a 1000 ml four-necked flask equipped with a stirrer, a thermometer, a condenser and a nitrogen displace apparatus, 200 ml of N-methyl-2-pyrrolidone, which had been dehydrated to purify it, and then 13.4 g of 1,1-bis[4-(4-aminobenzyl)phenyl]-4-cyclohexane was charged, and the mixture was dissolved with stirring. Then, the solution was cooled to 13° C., 6.54 g of pyromellitic dianhydride was added all at once, and the mixture was reacted with stirring and cooling. After one hour, 0.39 g of paraaminophenyltrimethoxysilane was added, and the mixture was reacted with stirring at 20° C. for one hour. Then, the reaction solution was diluted with a solution of N-methyl-2-pyrrolidone (NMP) and butyl cellosolve (BC) to obtain a transparent solution containing polyamic acid 2 of 6% by weight.

These polyamic acid solutions 1 and 2 were mixed at a proportion of 1 to 1 to use for preparing the following liquid crystal aligning film. The viscosity of the solution was 54 centipoises at 25° C.

The solution was applied on the substrate provided with an ITO electrode at one side of transparent glass by a spin coating method (a Spinner method). The coating conditions were 3000 rpm and 15 seconds. Then, the substrate having such coating film was dried at 100° C. for 10 minutes, put into an oven, and heated to 200° C. for one hour. At the same temperature, the substrate was heated for 90 minutes to obtain the liquid crystal aligning film of polyimide resin having film thickness of 3000 angstrom. After the resulting liquid crystal aligning film was left overnight at room temperature to determine the stripping load of the liquid crystal aligning film, the stripping load was 4.6 gf. Further, the adhesion to the substrate of the liquid crystal film was satisfactory.

Then, the solution of polyamic acid was diluted with a 1 to 1 solution of butyl cellosolve and NMP to obtain a 3% by weight solution of polyamic acid, and the solution was applied by a spin coating method (a Spinner method) on the substrate provided with the ITO electrode at one side of transparent glass. The coating conditions were 3000 rpm and 15 seconds. Then, the substrate having such coating film was dried at 100° C. for 10 minutes, put into an oven, and heated to 200° C. for one hour. At the same temperature, the substrate was heated for 90 minutes to obtain the liquid crystal aligning film of polyimide resin having film thickness of 600 angstrom.

Then, the resulting liquid crystal aligning film was rubbed. The rubbing was conducted at 0.4 mm of pushing length by using a piece of rayon cloth having 1.8 mm of pile length. Using two substrates comprised of the liquid crystal aligning films obtained by rubbing treatment, a liquid crystal cell was assembled so that the substrates were formed in parallel to the rubbing directions and opposed each other at intervals of 6 microns. Liquid crystal FB01 for TFT manufactured by CHISSO CORPORATION was enclosed in the cell, and the cell was heated at 120° C. for 30 minutes to conduct isotropic treatment, and cooled slowly to room temperature to obtain a liquid crystal display device.

In the liquid crystal display device, no scratches by the rubbing treatment and no alignment disorder were observed at a lighting test of the liquid crystal display device. Further, the dissolution of the aligning film in the liquid crystal was not observed at all.

Comparative example 1

To a 1000 ml four-necked flask equipped with a stirrer, a thermometer, a condenser and a nitrogen displace apparatus, 200 ml of N-methyl-2-pyrrolidone, which had been dehydrated to purify it, and then 28.2 g of 1,1-bis[4-(4-aminophenoxy)phenyl]-4-ethylcyclohexane was charged, and the mixture was dissolved with stirring. Then, the solution was cooled to 13° C., 13.08 g of pyromellitic dianhydride was added all at once, and the mixture was reacted with stirring and cooling. After one hour, 0.39 g of paraaminophenyltrimethoxysilane was added, and the mixture was reacted with stirring at 20° C. for one hour. Then, the reaction solution was diluted with a solution of N-methyl-2-pyrrolidone (NMP) and butyl cellosolve (BC) to obtain a transparent solution containing polyamic acid of 6% by weight. The viscosity of the solution was 51.2 centipoises at 25° C.

The solution was applied on the substrate provided with an ITO electrode at one side of transparent glass by a spin coating method (a Spinner method). The coating conditions were 2500 rpm and 15 seconds. Then, the substrate having such coating film was dried at 100° C. for 10 minutes, put into an oven, and heated to 200° C. for one hour. At the same temperature, the substrate was heated for 90 minutes to obtain liquid crystal aligning film of polyimide resin having film thickness of 2950 angstrom. After the resulting liquid crystal aligning film was left overnight at room temperature to determine the stripping load of the liquid crystal aligning film, the stripping load was 3.4 gf. Further, the adhesion to the substrate of the liquid crystal film was satisfactory.

Then, the solution of polyamic acid was diluted with a 1 to 1 solution of butyl cellosolve and NMP to obtain a 3% by weight solution of polyamic acid, and the solution was applied by a spin coating method (a Spinner method) on the substrate provided with the ITO electrode at one side of transparent glass. The coating conditions were 3000 rpm and 15 seconds. Then, the substrate having such coating film was dried at 100° C. for 10 minutes, put into an oven, and heated to 200° C. for one hour. At the same temperature, the substrate was heated for 90 minutes to obtain the liquid crystal aligning film of polyimide resin having film thickness of 600 angstrom.

Then, the resulting liquid crystal aligning film was rubbed. The rubbing was conducted at 0.4 mm of pushing length by using a piece of rayon cloth having 1.8 mm of (keashi). Using two substrates comprised of the liquid crystal aligning films obtained by rubbing treatment, a liquid crystal cell was assembled so that the substrates were formed in parallel to the rubbing directions and opposed each other at intervals of 6 microns. Liquid crystal FB01 for TFT manufactured by CHISSO CORPORATION was enclosed in the cell, and the cell was heated at 120° C. for 30 minutes to conduct isotropic treatment, and cooled slowly to room temperature to obtain a liquid crystal display device.

In the liquid crystal display device, rubbing scratches are observed according to the rubbing treatment conditions at slow rotational speed of the rubbing roller and slow moving rate of the substrate, and a little alignment disorder was observed at a lighting test of the liquid crystal display device. Further, the dissolution of the aligning film in the liquid crystal was not observed at all.

Comparative example 2

To a 1000 ml four-necked flask equipped with a stirrer, a thermometer, a condenser and a nitrogen displace apparatus, 200 ml of N-methyl-2-pyrrolidone, which had been dehydrated to purify it, and then 33.8 g of 1,1-bis[4-(3-trifluoromethyl-4-aminophenoxy)phenyl] cyclohexane was charged, and the mixture was dissolved with stirring. Then, the solution was cooled to 13° C., 13.08 g of pyrromellitic dianhydride was added all at once, and the mixture was reacted with stirring and cooling. After one hour, 0.39 g of paraaminophenyltrimethoxysilane was added, and the mixture was reacted with stirring at 20° C. Then, the reaction solution was diluted with a solution of N-methyl-2-pyrrolidone (NMP) and butyl cellosolve (BC) to obtain a transparent solution containing polyamic acid of 6% by weight. The viscosity of the solution was 51.2 centipoises at 25° C.

The solution was applied on the substrate provided with an ITO electrode at one side of transparent glass by a spin coating method (a Spinner method). The coating conditions were 2500 rpm and 15 seconds. Then, the substrate having such coating film was dried at 100° C. for 10 minutes, put into an oven, and heated to 200° C. for one hour. At the same temperature, the substrate was heated for 90 minutes to obtain the liquid crystal aligning film of polyimide resin having film thickness of 3000 angstrom. After the resulting liquid crystal aligning film was left overnight at room temperature to determine the stripping load of the liquid crystal aligning film, the stripping load was 2.8 gf. Further, the adhesion to the substrate of the liquid crystal film was satisfactory.

Then, the solution of polyamic acid was diluted with a 1 to 1 solution of butyl cellosolve and NMP to obtain a 3% by weight solution of polyamic acid, and the solution was applied by a spin coating method (a Spinner method) on the substrate provided with the ITO electrode at one side of transparent glass. The coating conditions were 3000 rpm and 15 seconds. Then, the substrate having such coating film was dried at 100° C. for 10 minutes, put into an oven, and heated to 200° C. for one hour. At the same temperature, the substrate was heated for 90 minutes to obtain liquid crystal aligning film of polyimide resin having film thickness of 600 angstrom.

Then, the resulting liquid crystal aligning film was rubbed. The rubbing was conducted at 0.4 mm of pushing length by using a piece of rayon cloth having 1.8 mm of (keashi). Using two substrates comprised of the liquid crystal aligning films obtained by rubbing treatment, a liquid crystal cell was assembled so that the substrates were formed in parallel to the rubbing directions and opposed each other at intervals of 6 microns. Liquid crystal FB01 for TFT manufactured by CHISSO CORPORATION was enclosed in the cell, the cell was heated at 120° C. for 30 minutes to conduct isotropic treatment, and cooled slowly to room temperature to obtain a liquid crystal display device.

In the liquid crystal display device, rubbing scratches are observed according to the rubbing treatment conditions at slow rotational speed of the rubbing roller and slow moving rate of the substrate, and a little alignment disorder was observed at a lighting test of the liquid crystal display device. Further, the dissolution of the aligning film in the liquid crystal was observed by isotropic treatment at 120°.

We claim:

1. A liquid crystal aligning film containing as a principal constituent a polyimide resin, which comprises two or more diamines, and having a stripping load of 4.0 gf or more measured by the following conditions:

Measuring apparatus: Shimazu scan scratch tester, SST-100, manufactured by Shimazu Seisakusho Ltd.;

Measuring conditions: constant rate of load test, needle tip diameter of 100 μm, vibrational amplitude of 100 μm, feed rate of 20 μm/s, loading rate of 1 μm/s, loading full scale of 20 gf, sample film thickness of 3000±50 angstrom wherein the two or more diamines are selected from the group consisting of diamines of the formulae

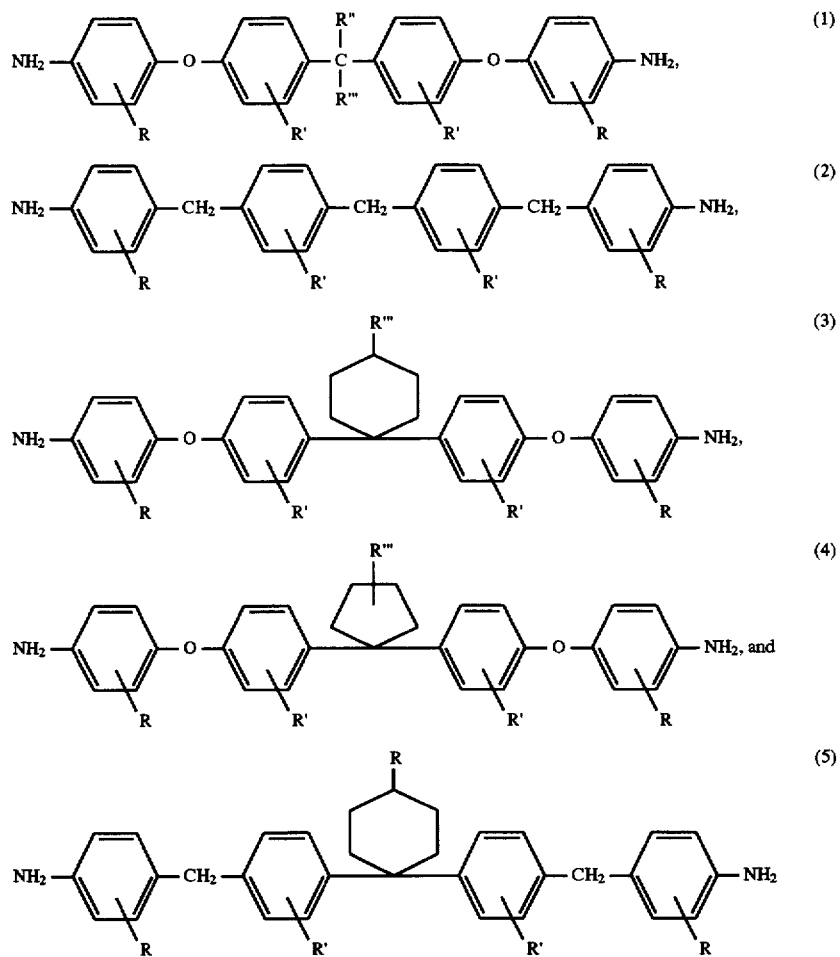
wherein R, R', R" and R'", each independently, represents H, —(CH$_2$)$_n$—CH$_3$, F, —(CF$_2$)$_n$—CF$_3$, —O—(CH$_2$)$_n$—CH$_3$ or —O—(CF$_2$)$_n$—CF$_3$.
2. A liquid crystal display device characterized in that the liquid crystal aligning film claimed in claim 1 is used.
3. A liquid crystal display device as claimed in claim 2, wherein a nematic liquid crystal is used.
* * * * *